(12) United States Patent
Brown (10) Patent No.: US 8,012,002 B2
(45) Date of Patent: Sep. 6, 2011

(54) ANIMAL CLEANING SYSTEM

(75) Inventor: Timothy D. Brown, Friona, TX (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 12/784,676

(22) Filed: May 21, 2010

(65) Prior Publication Data

US 2010/0297923 A1  Nov. 25, 2010

Related U.S. Application Data

(60) Provisional application No. 61/180,326, filed on May 21, 2009.

(51) Int. Cl.
*A22C 25/02* (2006.01)

(52) U.S. Cl. ........................................................ 452/173

(58) Field of Classification Search ................ 452/81, 452/114, 120, 123, 173; 15/3.1
See application file for complete search history.

(56) References Cited

U.S. PATENT DOCUMENTS

| | | | |
|---|---|---|---|
| 1,254,248 A | 1/1918 | Lowry | |
| 3,523,326 A | 8/1970 | Ambill | |
| 3,657,768 A | 4/1972 | Snowden | |
| 4,279,059 A | 7/1981 | Anderson et al. | |
| 4,337,549 A | 7/1982 | Anderson et al. | |
| 4,829,637 A | 5/1989 | Norri | |
| 4,862,557 A | 9/1989 | Clayton et al. | |
| 4,965,911 A | 10/1990 | Davey | |
| 5,291,906 A * | 3/1994 | White | 134/123 |
| 5,326,308 A | 7/1994 | Norrie | |
| 5,334,084 A * | 8/1994 | O'Brien et al. | 452/157 |
| 5,484,332 A | 1/1996 | Leech et al. | |
| 5,605,503 A | 2/1997 | Martin | |
| 5,651,730 A | 7/1997 | McGinnis et al. | |
| 5,853,320 A * | 12/1998 | Wathes et al. | 452/88 |
| 5,882,253 A | 3/1999 | Mostoller | |
| 5,938,519 A * | 8/1999 | Wright | 452/173 |
| 6,196,912 B1 | 3/2001 | Lawler, Jr. et al. | |
| 6,220,951 B1 | 4/2001 | Clayton et al. | |
| 6,277,207 B1 * | 8/2001 | Gauthier | 134/18 |
| 6,733,379 B2 | 5/2004 | Tsang | |
| 6,807,973 B2 * | 10/2004 | Fratello et al. | 134/123 |
| 7,207,879 B2 * | 4/2007 | Kelly et al. | 452/77 |
| 7,438,075 B1 * | 10/2008 | Huntington et al. | 134/57 R |
| 7,458,886 B1 * | 12/2008 | Griffiths et al. | 452/173 |
| 7,559,333 B2 * | 7/2009 | Belanger | 134/180 |
| 7,566,260 B1 * | 7/2009 | Griffiths et al. | 452/173 |
| 7,575,509 B2 * | 8/2009 | Chattin et al. | 452/95 |
| 7,648,412 B2 * | 1/2010 | Kjeldsen | 452/88 |

OTHER PUBLICATIONS

Goforth, Kerry, et al. "Beef Industry Cabinet Design: A Case Study", 5 pgs.

(Continued)

*Primary Examiner* — Thomas Price (57) ABSTRACT

Systems and methods for cleaning animals are disclosed. In one embodiment, an apparatus for cleaning a plurality of carcasses of harvested animals includes a track system configured to convey the carcasses through a plurality of carcass disassembly stations. The apparatus also includes a spray system for directing a fluid at a portion of at least one of the carcasses. The spray includes a plurality of nozzles configured to rotate relative to the track system. The spray system directs the fluid onto each of the carcasses in a tracking manner as the carcass moves from a first carcass location to a second carcass location. In another embodiment, a method for cleaning a plurality of carcasses of harvested animals includes providing an assembly line for conveying the carcasses through a plurality of carcass processing stations. At least one of the stations comprises a spray nozzle assembly for directing a fluid in a rotating path at a portion of each of the carcasses. The method also includes directing the fluid onto each of the carcasses in a tracking manner as the carcass moves from a first location to a second location on the assembly line.

8 Claims, 10 Drawing Sheets

OTHER PUBLICATIONS

Koohmaraie, Mohammad, "Post-Harvest Food Safety Research at U.S. Meat Animal Research Center", 65 pgs.

Bjerklie, Steve, "Excel: Best-Practices in Action", Meat Processing@ www.meatnews.com (Sep. 2003), (5 pgs.).

Bjerklie, Steve "It's All About Knowing What Goes on", Meat Processing@ www.meatnews.com (Sep. 2003), pp. 36, 38-39.

Van Donkersgoed, J., et al., "Preslaughter Hide Status of Cattle and the Microbiology of Carcasses", Journal of Food Protection, vol. 60, No. 12 (1997), pp. 1502-1508.

* cited by examiner

ANIMAL CLEANING SYSTEM

CROSS-REFERENCE TO RELATED APPLICATIONS

The present application claims the benefit of U.S. Application No. 61/180,326 filed 21 May 2009, entitled "ANIMAL CLEANING SYSTEM", the disclosure of which is incorporated herein by reference in its entirety.

TECHNICAL FIELD

The present disclosure relates generally to an animal cleaning system. Aspects of the disclosure are particularly directed to a spray system for cleaning areas of a beef or pork carcass.

BACKGROUND

It is generally known to use automated carcass washing systems to aid in the removal of physical and microbial contaminants during the harvest process for hided carcasses, de-hided pre-evisceration carcasses, split carcass sides as well as specific parts or areas of the carcass. In such known systems, the whole or split carcass (or part thereof) is conveyed along a chain or rail through at least one (usually a series of) cabinet(s) typically comprised of stationary or oscillating arbor(s) with a series of nozzles attached. Additionally, nozzles are typically placed along a series of arbors to provide directional flow of the contaminants from top to bottom of the carcass or part.

However, one shortcoming associated with such known carcass washing systems is that a large amount of wash solution (air, water, chemical, etc.) is wasted between carcasses (or parts of the carcass) as they move along the chain or rail. Furthermore, known oscillating systems and directionally placed flow nozzle systems require a considerable number of nozzles to perform properly.

Accordingly, there is a need for a system for reducing the amount of solution wasted by not spraying in the gaps between carcasses as the chain moves down the line. Moreover, there is a need for systems to reduce the overall number of nozzles without reducing the efficacy of the washing system in regards to amount of solution applied to a specific carcass.

DETAILED DESCRIPTION

Overview

Specific details of several embodiments of this disclosure are described below with reference to the FIGURES.

One aspect of the present disclosure is directed toward an apparatus for cleaning a plurality of carcasses of harvested animals. The apparatus includes a track system configured to convey the carcasses through a plurality of carcass disassembly stations. The apparatus also includes a spray system for directing a fluid at a portion of at least one of the carcasses. The spray includes a plurality of nozzles configured to rotate relative to the track system. The spray system directs the fluid onto each of the carcasses in a tracking manner as the carcass moves from a first carcass location to a second carcass location.

This disclosure also sets forth a method for cleaning a plurality of carcasses of harvested animals. The method includes providing an assembly line for conveying the carcasses through a plurality of carcass processing stations. At least one of the stations comprises a spray nozzle assembly for directing a fluid in a rotating path at a portion of each of the carcasses. The method also includes directing the fluid onto each of the carcasses in a tracking manner as the carcass moves from a first location to a second location on the assembly line.

Figure 1:
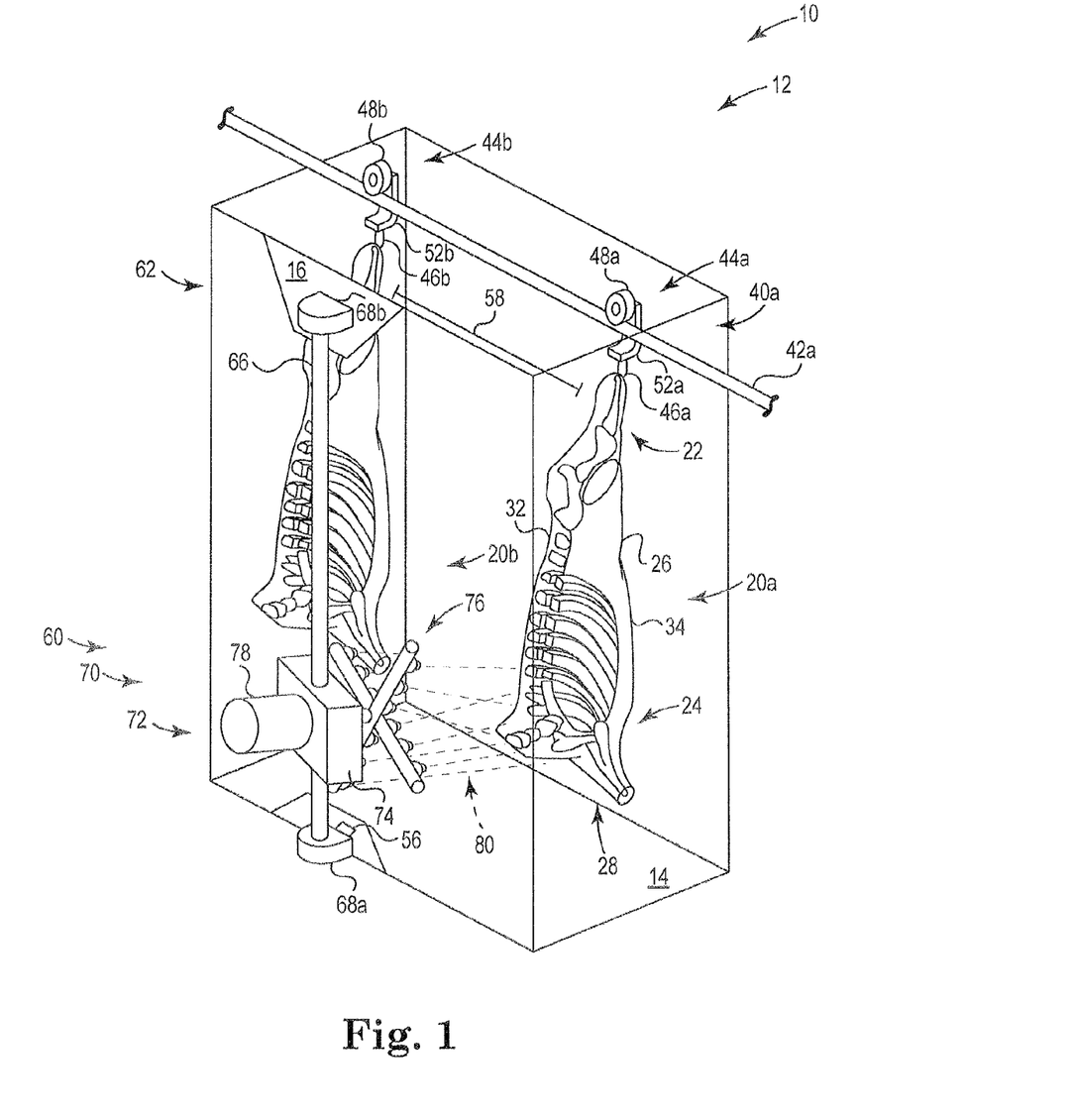
FIG. 1 is a perspective view of a carcass cleaning system according to an exemplary embodiment.

Referring to FIG. 1, a work environment 10 is shown having a first animal carcass (i.e. split carcass 20a) and a second animal carcass (i.e. split carcass 20b). Split carcass 20a and split carcass 20b are each attached to an overhead drive system 40a for conveying and translating carcasses in work environment 10. A carcass cleaning system 60 having a fluid spraying system 70 directs a fluid spray 80 (such as water) onto each of split carcass 20a and split carcass 20b Work Environment Work environment 10 is typically a fabrication area of an animal harvesting facility (e.g. a place for slaughter, disassembly, processing, fabrication, etc.). A work area 12 is shown in work environment 10 as a specific location (e.g. assembly line) where split carcass 20a and split carcass 20b are washed and cleaned. The work area may be any area in a work environment where animals or parts thereof are cleaned (e.g. live animal wash, hided carcass wash, de-hided pre-evisceration carcasses, split carcass wash, neck wash, etc.).

Carcass

Referring further to FIG. 1, each of split carcass 20a and split carcass 20b are shown split as a side of beef. Split carcass 20a and split carcass 20b are each shown having a hind quarter area (i.e. beef round end 22) near drive system 40a, and a forequarter area (i.e. beef chuck end 24) near a floor 14. Split carcass 20a and split carcass 20b each have an exterior (typically fatty) surface 26 from which the hide has been removed, and an interior surface 28 (i.e. near the interior cavity of the carcass from which viscera has been removed).

In FIG. 1, spraying system 70 is shown directing fluid spray 80 toward the neck area (i.e. near atlas, neck, shoulder and shank) of split carcass 20a.

The term "carcass" as used in this disclosure means the whole body of an animal after exsanguination before evisceration. The terms "carcass side" and "split carcass" as used in this disclosure means a carcass that is split in half after evisceration. Although the carcass cleaning system and the carcass is described in this disclosure with reference to a carcass and carcass side of a beef animal, the carcass cleaning system is applicable to all bovine, porcine, equine, caprine, ovine, avian animals, or any other animal commonly slaughtered for food production. In this disclosure, bovine animals include, but are not limited to, buffalo and all cattle, including steers, heifers, cows, and bulls. Porcine animals include, but are not limited to feeder pigs and breeding pigs, including sows, gilts, barrows, and boars. Ovine animals include, but are not limited to, sheep, including ewes, rams, wethers, and lambs. Caprine animals include, but are not limited to, goats, including does, bucks, wethers, and kids. Avian animals include, but are not limited to, birds, including chickens, turkeys, and ostriches.

Drive System

Split carcass 20a and split carcass 20b are each suspended or hung from an overhead rail 42a of drive system 40a above floor 14. (According to alternative embodiments, the drive system may include multiple rails and the rail can be any mechanism for conveying a carcass such as a chain.) A first trolley 44a and a second trolley 44b each hang from rail 42a. As shown in FIG. 1, trolley 44a and trolley 44b each include a hook 46a and a hook 46b for attachment to the hind shank and gambrel of the carcass. Each of hook 46a and hook 46b is shown attached to a wheel 48a and a wheel 48b (respectively) via a conveyor 52a and 52b (respectively) that follows along rail 42a. Alternatively, the trolleys may be captive trolleys that have no wheel, but rather shackles connected directly to a drive chain associated with the rail. In a further alternative, the trolleys are any known device for holding an animal carcass in a suspended position for movement through a meat processing application.

Each of trolley 44a and trolley 44b is provided to traverse along rail 42a at predetermined intervals. A gap or space 58 is provided between each trolley 44a and 44b along rail 42a. The space can be anywhere from about two feet to about six feet for beef carcasses (less space is needed for smaller animals) according to alternative embodiments. According to a preferred embodiment, the space between trolleys is about 4 feet for beef carcasses.

The drive system operates at commercial chain speeds according to a preferred embodiment. The commercial chain speed is preferably performed at a rate of at least about 150 beef carcasses (i.e. 300 split carcass sides) per hour, more preferably at a rate of at least about 300 beef carcasses per hour. The commercial chain speed may be faster for small animals (e.g. pigs, sheep, goats, turkeys, chickens, etc.).

Spray System

Referring further to FIG. 1, spraying system 70 is shown having a spray assembly 72 attached by a mounting system 62 to an overhead mounting structure 16 (such as a ceiling). Mounting system 62 includes a vertical support structure (shown as an upright support bar 66) extending from floor 14 to overhead mounting structure 16. Support bar 66 includes a lower mounting bracket 68a attached (e.g. welded, screwed, etc.) to floor 14, and an upper mounting bracket 68b attached to overhead mounting structure 16.

A housing unit 74 of spray assembly 72 is pivotally attached to support bar 66. A pump 50 controlled by a control system 54 provides fluid (e.g. water) from a fluid source 52 to housing unit 74 (see FIG. 6). The fluid is then provided or pumped to a spray bar system 76. Spray bar system 76 includes a lower vertical spray arbor or bar 82 and an upper horizontal spray arbor or bar 84 attached to housing unit 74 (see FIG. 2). Lower bar 82 and upper bar 84 of spray bar system 76 spin about a horizontal axis 86 relative to housing unit 74.

Figure 2:
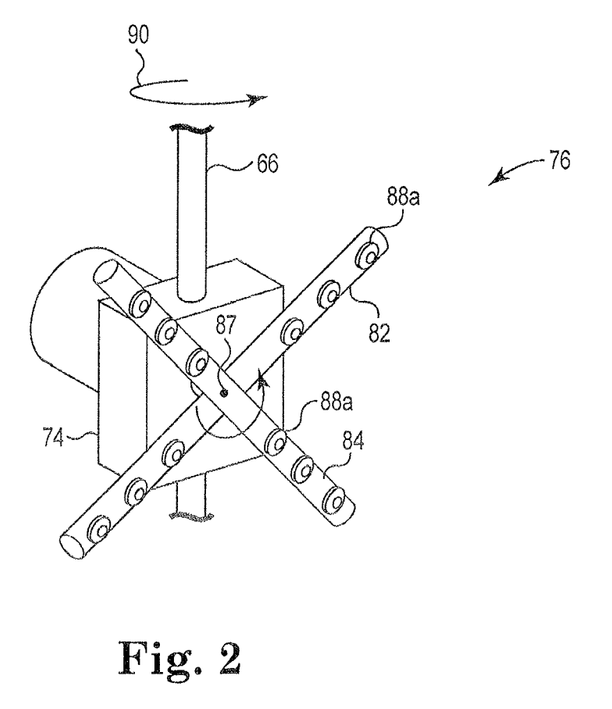
FIG. 2 is a perspective view of a spray system of the carcass cleaning system shown in FIG. 1.

Referring to FIG. 2, lower spray bar 82 and upper spray bar 84 each include a plurality of spouts (shown as nozzles 88a) for applying fluid to the carcasses. The nozzle is selected to provide a spray pattern optimized for cleaning the carcass. According to alternative embodiments, the nozzle design may be selected to optimize another spray pattern such as cooling, cleaning, coating, lubricating, drying, parts washing, etc. According to one embodiment, the nozzle is a flat spray (tapered) nozzle to provide a tapered-edge flat spray pattern and to provide uniform coverage over the entire swath as a result of overlapping distributions.

Figure 3:
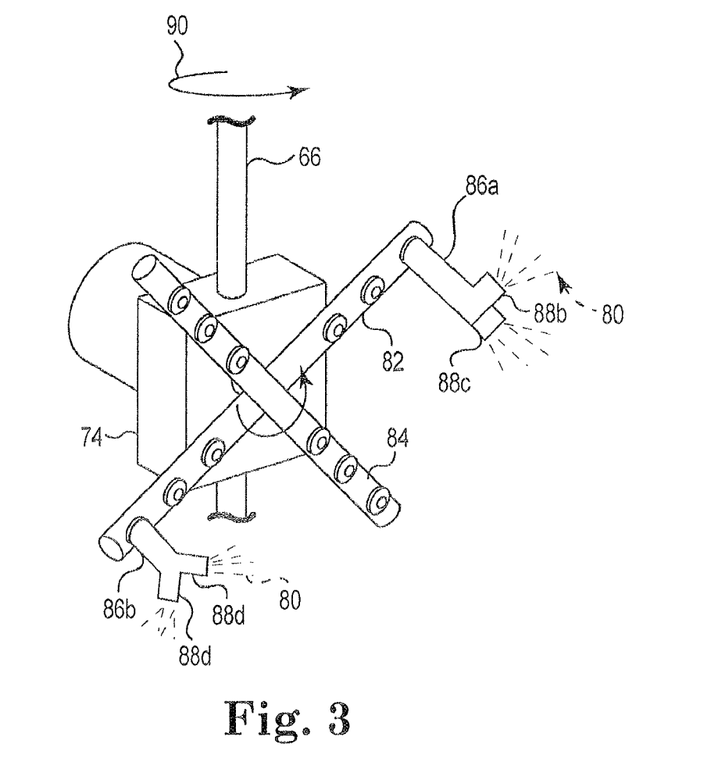
FIG. 3 is a perspective view of the spray system shown in FIG. 2 according to an alternative embodiment.

Referring to FIG. 3, a spout 86a is shown on lower spray bar 82 according to an alternative embodiment. Spout 86a includes a spray nozzle 88b and a spray nozzle 88c. Spray nozzle 88b is shown oriented parallel to lower spray bar 82 and spray nozzle 88c is shown parallel to upper spray bar 84.

Referring further to FIG. 3, a spout 86b is shown on lower spray bar 82 according to another alternative embodiment. Spout 86b includes two spray nozzles 88d. Spray nozzles 88d are shown oriented at an obtuse angle relative to lower spray bar 82.

Oscillation

Figure 4A:
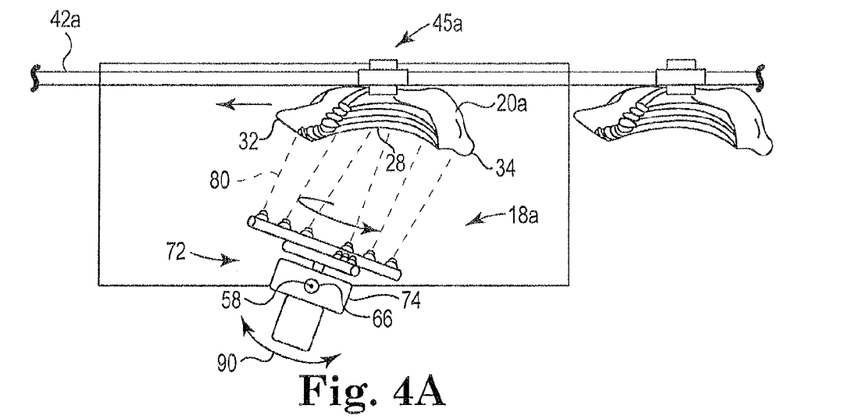
FIG. 4A is top view of the carcass cleaning system of FIG. 1 showing the spray system in a first pivot position.
Figure 4B:
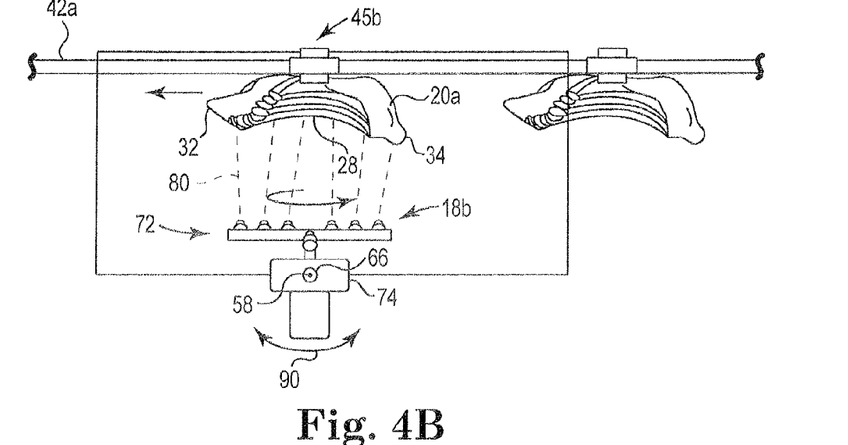
FIG. 4B is top view of the carcass cleaning system of FIG. 1 showing the spray system in a second pivot position.
Figure 4C:
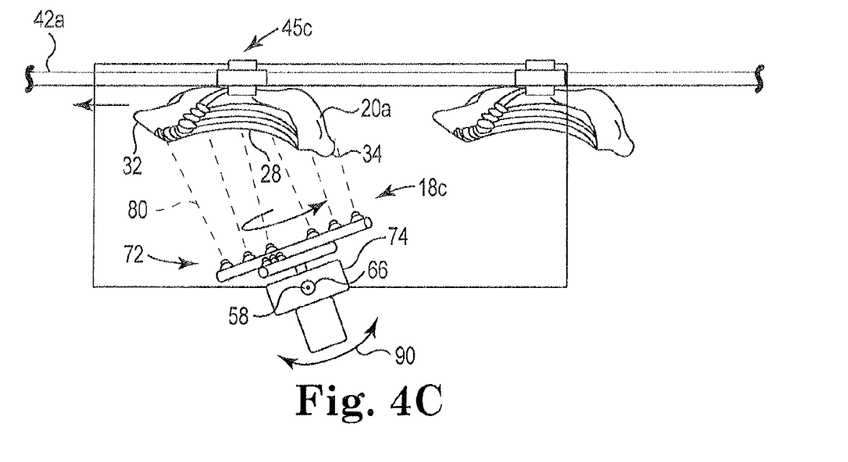
FIG. 4C is top view of the carcass cleaning system of FIG. 1 showing the spray system in a third pivot position.

The nozzles on the spray bars can be configured in any number of ways depending on desired nozzle spray patterns. Referring to FIGS. 4A through 4C, housing unit 74 of spray assembly 72 is configured to pivot about support bar 66 (e.g. about 180 degrees or less). Thus, spray assembly 72 oscillates along path 90 as shown in FIGS. 4A through 4C. In FIG. 4A, split carcass 20a is shown at a first rail location 45a relative to rail 42a, and spray assembly 72 is shown in a first pivot position 18a with fluid spray 80 directed primarily on a leading surface 32 of split carcass 20a. In FIG. 4B, split carcass 20a is shown at a second rail location 45b relative to rail 42a, and spray assembly 72 is shown in a second pivot position 18b with fluid spray 80 directed primarily on interior surface 28 of split carcass 20a. In FIG. 4C, split carcass 20a is shown at a third rail location 45c relative to rail 42a, and spray assembly 72 is shown in a third pivot position 18c with fluid spray 80 directed primarily on a trailing surface 34 of split carcass 20a.

In one embodiment, the spray assembly oscillates among the second pivot position (generally in-line with the split carcass), the first pivot position (about 60 degrees from the second position toward the leading edge of the split carcass) and the third pivot position (about 60 degrees from the second position toward the leading edge of the split carcass). In another embodiment, the spray assembly oscillates between any pivot positions (e.g. between the first and third pivot positions) that is effective in removing microbes and particles from the carcass.

In one alternative embodiment, the housing of the spray system is mechanically coupled to an oscillator to effect oscillation of the spray assemblies. In one embodiment, if multiple spray assemblies are employed, the spray assemblies may be coupled to one another to accomplish synchronized oscillation.

Figure 5A:
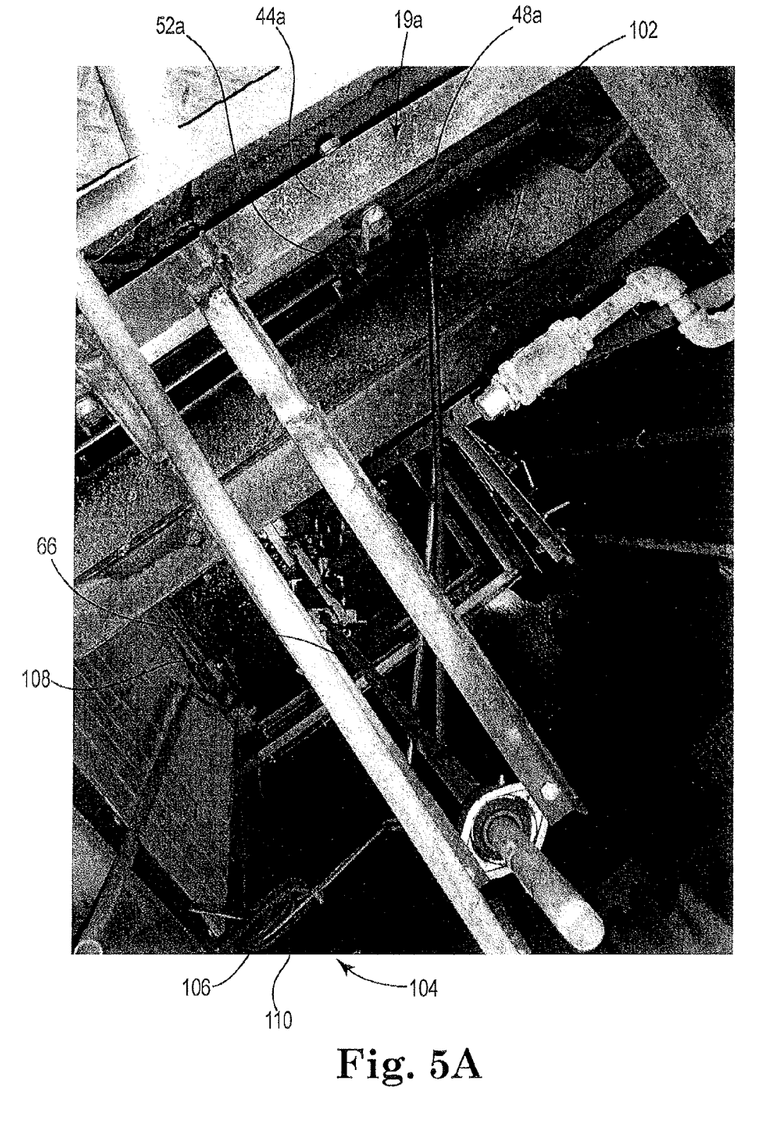
FIG. 5A is a photograph of the carcass cleaning system of FIG. 1 showing the spray system in the first pivot position.
Figure 5B:
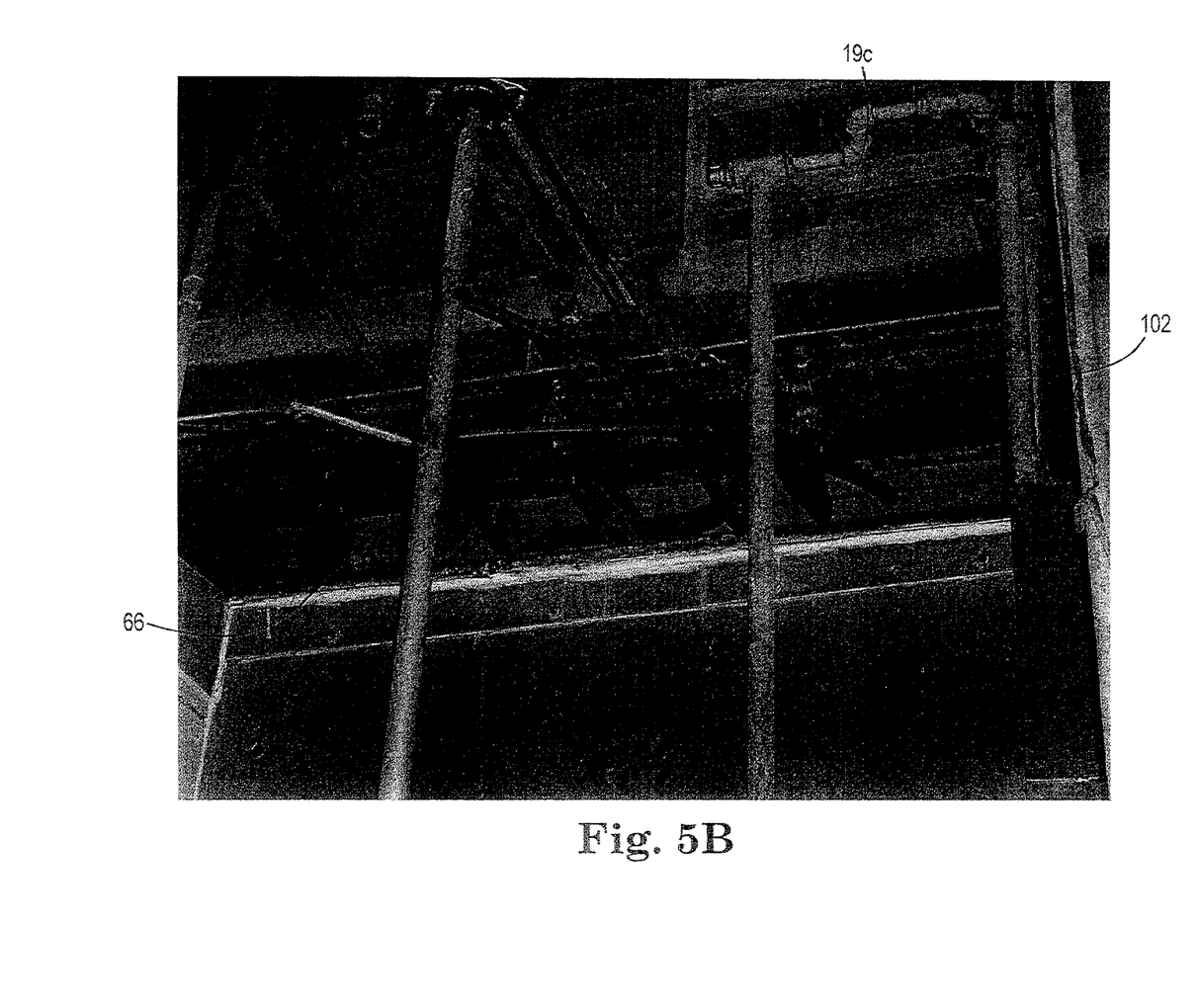
FIG. 5B is a photograph of the carcass cleaning system of FIG. 1 showing the spray system in the second pivot position.
Figure 5C:
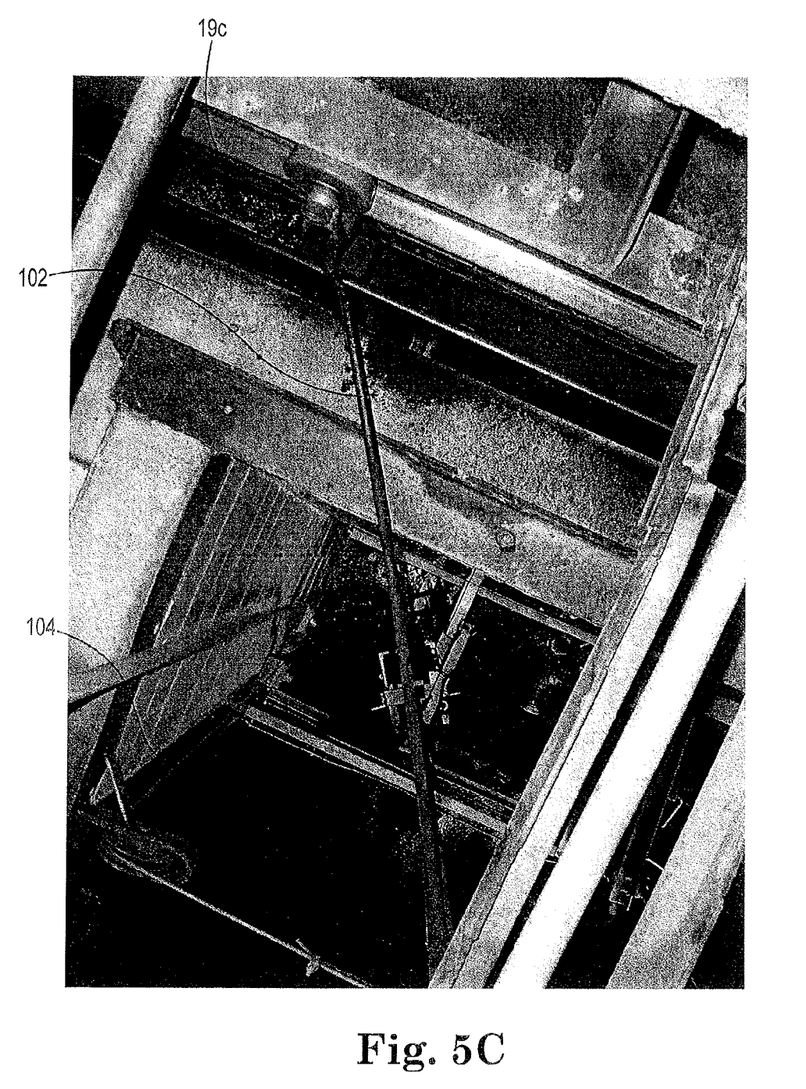
FIG. 5C is a photograph of the carcass cleaning system of FIG. 1 showing the spray system in the third pivot position.

The spraying system can be configured to focus on a carcass while moving to effectively wash both the leading and trailing surfaces of the carcass, while minimizing wasted fluid. Thus, the spray system can provide "following" or "tracking" of the flow of fluid on the carcass as the carcass moves past the spray assembly. Referring to FIGS. 5A through 5C, an arm 102 welded to vertical support 66 engages conveyor 52a (shown as a dog or bracket), which is connected to wheel 48a of trolley 44a. As trolley 44a moves in direction 92, conveyor 52a pushes arm 102 in direction 42. As arm 102 moves in direction 92, it pivots vertical support 66 and attached spraying system 76 from first position 18a to second position 18b and finally to third position 18c (see FIGS. 4A through 4C). After spraying system 76 arrives in third pivot position 18c, arm 102 reaches its limit position, and conveyor 52a disengages arm 102. A counterbalance system 104 (shown as a cable 106 connecting arm 102 to a weight 108 via a pulley system 110) returns arm 102 to first position 18a.

Referring to FIG. 5A, spraying system 76 is shown in first pivot position 18a, and arm 102 is shown in first position 19a. Referring to FIG. 5B, spraying system 76 is shown in second pivot position 18b, and arm 102 is shown in second position 19b. In FIG. 5B, conveyor 52a is shown engaging arm 102 and pushing arm 102 in direction 92. Referring to FIG. 5C, spraying system 76 is shown in third pivot position 18c, and arm 102 is shown in third position 19b. In FIG. 5C, arm 102 has almost reached its limit position, and afterwards counterbalance system 104 will cause arm 102 to return to first position 19a, and accordingly cause spraying system 76 to return to first pivot position 18a (as shown in FIG. 5A).

Figure 6:
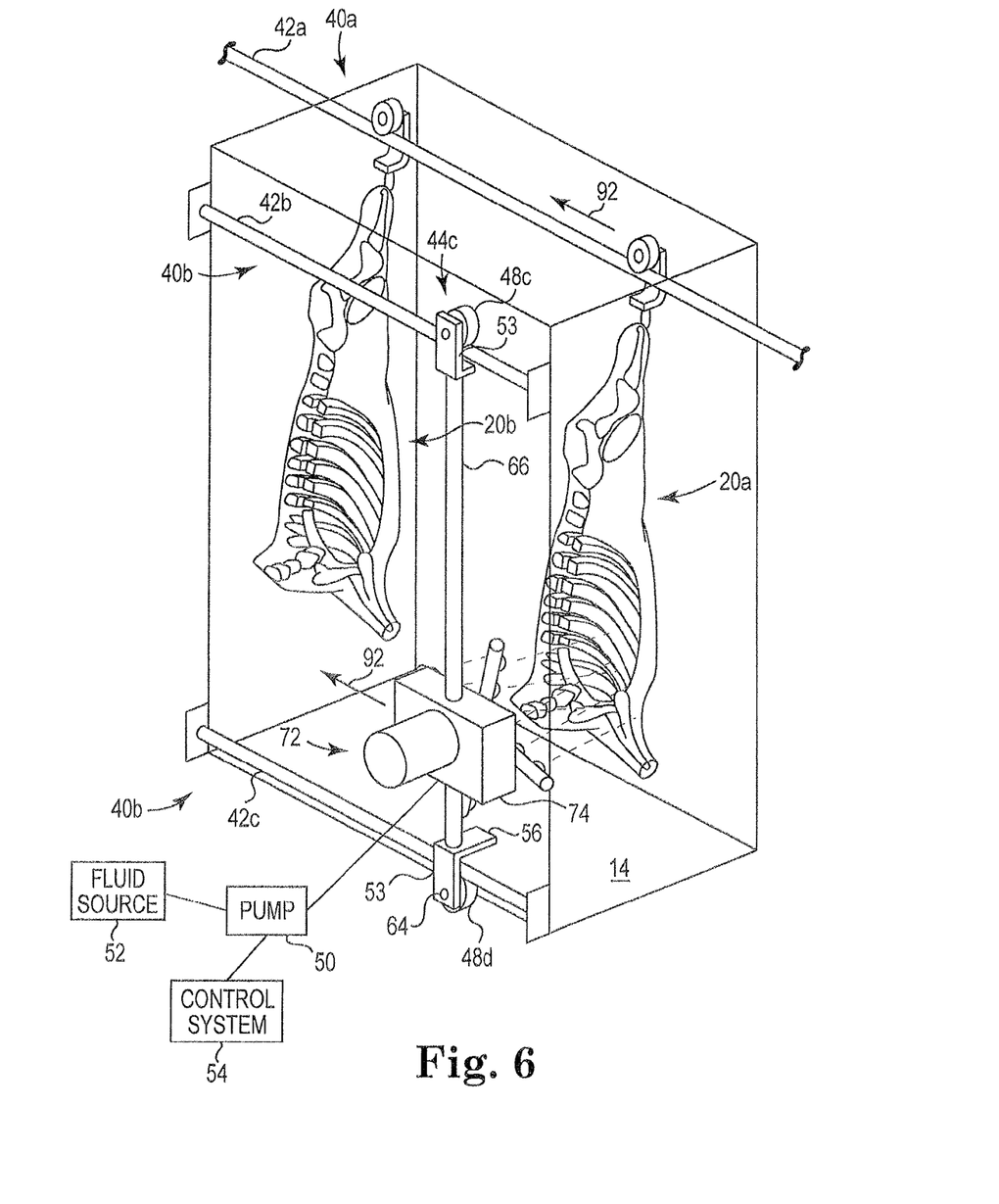
FIG. 6 is a schematic view of a carcass cleaning system showing the spray system of FIG. 1 according to an alternative embodiment.

A sensor 56 (e.g. optical, mechanical, etc.) is shown in FIG. 6 configured to send a signal to control system 54 that is representative of the location of split carcass 20a on rail 42a. The direction of the spray can be controlled by a processor of the control system using information from the optical sensor. According to an alternative embodiment, the location of the carcass is monitored by a mechanical location measurement sensor, and the direction of the spray system is controlled by a processor using information from the mechanical location measurement sensor.

In accordance with one embodiment, the oscillation and translation of the spray assembly is implemented by a computer system. The computer system includes a sensing system (e.g., having a sensor) configured for ascertaining an attribute (e.g. location of a carcass relative to the rail). The sensing system is configured to provide a signal representative of the attribute to a control system. The control system may include a computing device, microprocessor, controller or programmable logic controller (PLC) for implementing a control program, and which provides output signals based on input signals provided by the sensor or that are otherwise acquired. Any suitable computing device of any type may be included in the computer system according to other exemplary embodiments. For example, computing devices of a type that may comprise a microprocessor, microcomputer or programmable digital processor, with associated software, operating systems and/or any other associated programs to implement the control program may be employed. The control system and its associated control program may be implemented in hardware, software, firmware, or a combination thereof, or in a central program implemented in any of a variety of forms (e.g., hardware and/or software and/or firmware) according to alternative embodiments.

Rotation

Referring further to FIGS. 2 and 3, lower spray bar 82 and upper spray bar 84 spin (e.g. pivots, rotates, follows a circular path, etc.) about horizontal axis 86 relative to housing unit 74. According to a preferred embodiment, the spray bars are configured 90 degrees to one another, and spin 360 degrees in a clockwise direction. Without intending to be limited to any particular theory, it is believed that the spinning of the spray bars assists in providing a downward force to drive fluid in a downward direction, which may create a scrubbing effect to both loosen more physical debris (e.g. hair, blood, fat, trim, etc.) and increase microbial killing efficacy from the split carcass to assist in washing. The spinning action may be provided by the motor, or by arrangement of the nozzles (e.g. the force of the water exiting angled nozzles may create centrifugal force to cause the spray bars to spin).

Translation

Referring to FIG. 6, spray assembly 72 may translate along horizontal path 92 in parallel with the translation of split carcass 20a and split carcass 20b on rail 42a. As shown in FIG. 6, spray assembly 72 is pivotally attached to support bar 66. Support bar 66 is mounted to an overhead rail 42b of a drive system 40b and a lower rail 42c of drive system 40b. An upper wheel 48c of trolley 44c travels along rail 42b, and a lower wheel 48d travels along lower rail 42c along floor 14. Wheel 48c and wheel 48d are attached to a bracket 53 by a fastener 64 to couple wheel 48c and wheel 48d to support bar 66.

Figure 7A:
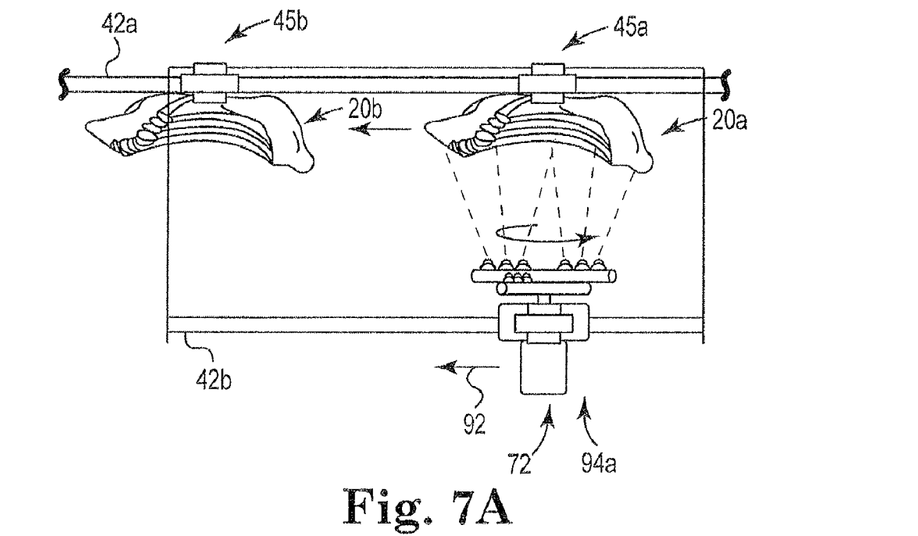
FIG. 7A is top view of the carcass cleaning system of FIG. 6 showing the spray system in a first rail location.
Figure 7B:
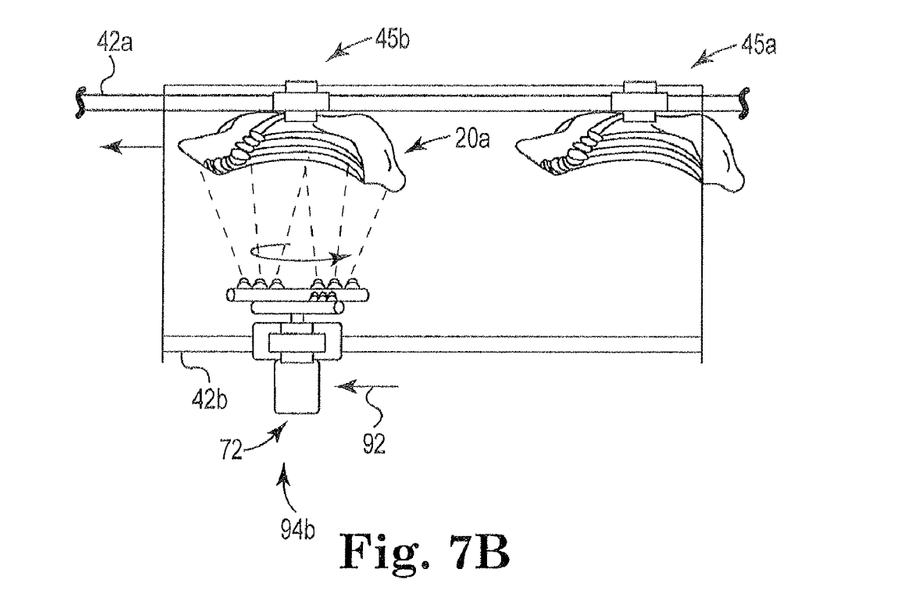
FIG. 7B is top view of the carcass cleaning system of FIG. 6 showing the spray system in a second rail location.

Referring to FIGS. 7A and 7B, spray assembly 72 moves along horizontal path 92 and stays in alignment with split carcass 20a as split carcass 20a moves from first rail location 45a to second rail location 45b. As shown in FIG. 7A, spray assembly 72 is in a first horizontal location 94a to spray split carcass 20a in first rail location 45a. As shown in FIG. 7B, spray assembly 72 has moved to a second horizontal location 94b to spray split carcass 20a in second rail location 45b. Afterward completion of spraying a carcass, the spray assembly can return to its original location to spray the next carcass on the rail.

Figure 8A:
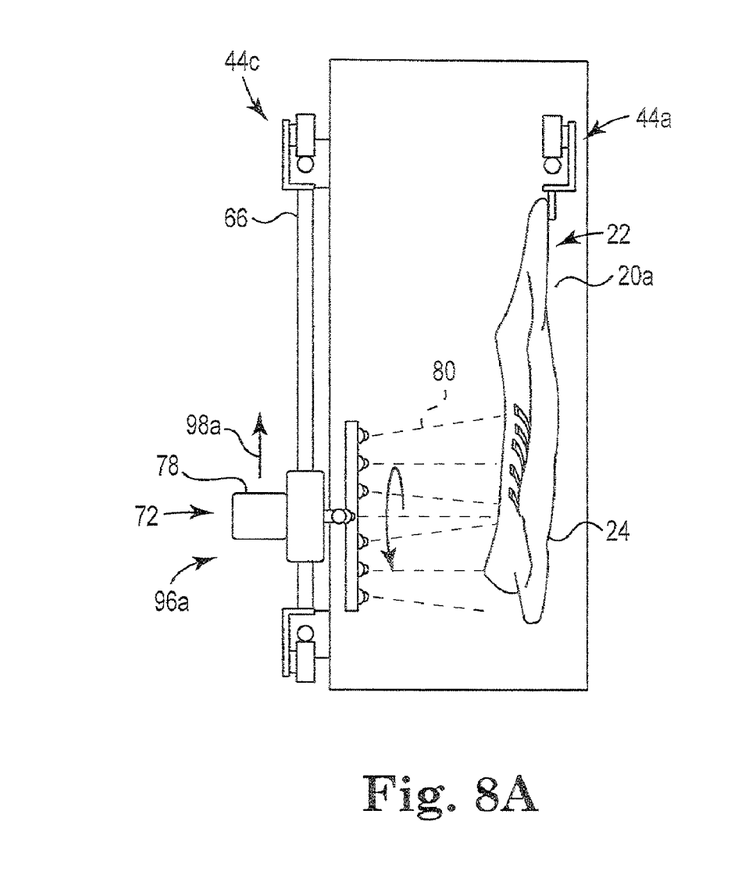
FIG. 8A is a side elevation view of the carcass cleaning system of FIG. 6 showing the spray system in a first vertical location according to an alternative embodiment.
Figure 8B:
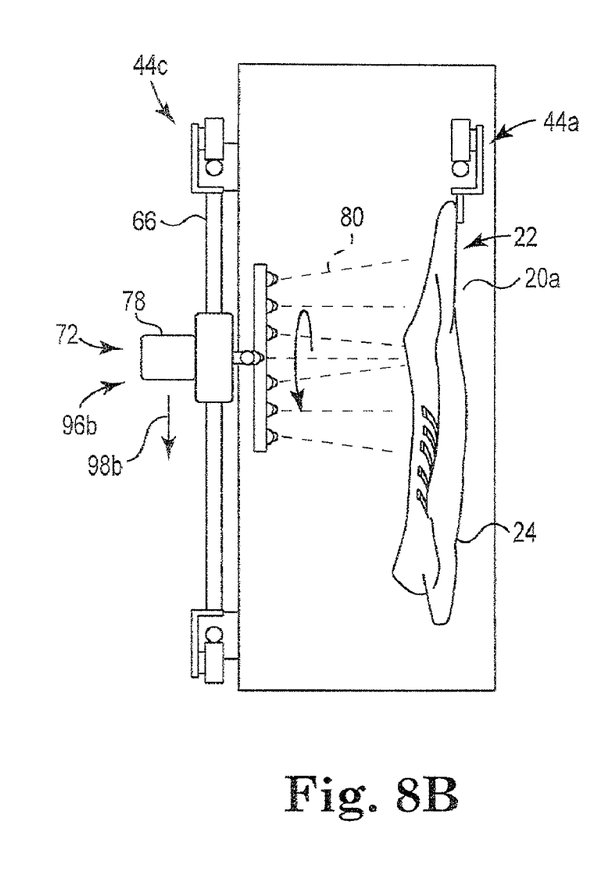
FIG. 8B is a side elevation view of the carcass cleaning system of FIG. 6 showing the spray system in a second vertical location according to an alternative embodiment.

The spray assembly may be configured to spray any area of a carcass. As shown in FIG. 8A, spray assembly 72 is shown in a first vertical location 96a with fluid spray 80 directed to chuck end 24 of split carcass 20a. Spray assembly 72 may follow upward vertical path 98a to raise spray assembly 72 toward round end 22 of split carcass 20a. As shown in FIG. 8B, motor 78 drives spray assembly 72 up support bar 66 to second vertical location 96b to direct fluid spray 80 to round end 22 of split carcass 20a. Spray assembly 72 may then return along downward vertical path 98b to spray chuck end 24 of split carcass 20a. According to an alternative embodiment, multiple spray assemblies may be provided on the same support bar to spray various areas of the carcass (e.g. without translating between vertical locations). According to another alternative embodiment, the spray bars may pivot in a vertical direction (e.g. 60 degrees up and down from a center position) to spray different vertical areas of a carcass. According to another alternative embodiment, the spray assembly can be located on any side of a carcass (e.g. facing the interior, exterior, leading edge, trailing edge, etc.), or the carcass can be provided on the rail in a position so that any surface of the carcass is facing the spray assembly.

Fluid Rates

The fluid provided through the spray assembly is preferably water, and may be any fluid or chemical that is desired at the application site. In general, the volumetric flow rate of the fluid through the nozzle is determined by the nozzle size and the pressure of the fluid. According to a particularly preferred embodiment, nozzle is a ¼ inc MEG WashJet nozzle model number 2510TC commercially available from Spraying Systems Co. of Wheaton, Ill., and the volumetric flow rate of fluid through the nozzle is about ¾ gallons per minute, when the pressure of the fluid is about 50 psi. Variation in pressure and flow rate could be accomplished by adjusting the nozzle orifice to accommodate a larger volume of water with less orifice restriction.

Fluid Temperatures

In one embodiment, the fluid (e.g. water) is provided to cool or chill the carcass side. For example, the water may be provided at a temperature from about 33 to about 40 degrees Fahrenheit, more preferably from about 34 to about 36 degrees Fahrenheit.

In another embodiment, the fluid (e.g. water) is provided to reduce microbes on the carcass. For example, the water may be provided at above about a temperature above 180 degrees Fahrenheit, preferably from about 180 degrees Fahrenheit to about 210 degrees Fahrenheit, more preferably from about 180 degrees Fahrenheit to about 190 degrees Fahrenheit. The temperature of the water may also be as high as known temperatures to facilitate mixing of the additives (e.g. surfactants, antimicrobials, etc.).

Fluid Composition

The fluid may be any fluid for cleaning (e.g. water) or drying (e.g. air) a carcass or carcass side. The fluid may include additives (e.g. surfactants, antimicrobials, etc.). Further additives can be included with the antimicrobial agent. Soil softening agents, for example, can be added to promote the cleaning of the carcass (or hide). Any additives known to promote the reduction of microbial levels on the hide or carcass may be used according to embodiments of the present invention.

The antimicrobial agent may be any chemical or substance capable of killing, neutralizing, or removing microorganisms. In one embodiment, the antimicrobial agent is water or some combination of water and at least one other antimicrobial agent. The antimicrobial agent can be applied in a liquid, foam, paste, soap, or other form. In a further embodiment, the antimicrobial agent is one solute in a fluid solution or one component in a fluid mixture. In one embodiment, the agent is a surfactant or is applied in combination with a surfactant. In one embodiment, the fluid involves the use of a combination of two or more antimicrobial agents.

The additive can include any additive known to kill or remove microorganisms. For example, in one embodiment, the antimicrobial agent includes bases or caustics, acids, esters, oxidizers, or enzymes. Other examples include treated water, such as electrolytic water, ozonated water, or charged water, which includes hydrogen ions added to or removed from the water. In various embodiments, the antimicrobial agent includes one or more of sodium hydroxide, chlorine, sodium metasilicate, phosphoric acid, fatty acid monoesters, organic acids, and hydrogen peroxide. In another embodiment, the fluid is a probiotic agent. A probiotic agent is non-harmful bacteria or other microbial that competitively prevents growth of microbial pathogens. Other additives may include lactic acid solution or POAA (peroxyacedic acid) solutions.

In certain embodiments, an alkaline material mixed with water may be used as the antimicrobial agent. For example sodium hydroxide or potassium hydroxide may be combined with water in an amount effective to reduce or eliminate microbe concentration. In one embodiment, sodium hydroxide is present in an amount of between about 0.1 and about 5 percent by volume. In another embodiment, a sufficient concentration of an alkaline material is utilized to provide an antimicrobial having a pH of at least 11, more particularly between about 11 and 13, and even more particularly, between about 12 and about 13.

In another embodiment, the antimicrobial agent is water in combination with an acidified chlorine titrated with an acid such as citric acid to a pH of about 5.0 to 6.5. In various embodiments, the acidified chlorine is present in a concentration of from about 50 to about 600 ppm. In one embodiment, the acidified chlorine is present in a concentration of about 200 ppm.

For ease of understanding, methods of using the carcass spray system are described with reference to the systems shown in the FIGURES. Those skilled in the art will recognize, however, that aspects of such methods can be carried out in other systems.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. When the claims use the word "or" in reference to a list of two or more items, that word covers all of the following interpretations of the word: any of the items in the list, all of the items in the list, and any combination of the items in the list.

The above detailed descriptions of embodiments of the invention are not intended to be exhaustive or to limit the invention to the precise form disclosed above. Although specific embodiments of, and examples for, the invention are described above for illustrative purposes, various equivalent modifications are possible within the scope of the invention, as those skilled in the relevant art will recognize. For example, while steps are presented in a given order, alternative embodiments may perform steps in a different order. The various embodiments described herein can also be combined to provide further embodiments.

In general, the terms used in the following claims should not be construed to limit the invention to the specific embodiments disclosed in the specification, unless the above detailed description explicitly defines such terms. While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

I claim

1. An apparatus for cleaning a plurality of carcasses of harvested animals, comprising:
   a track system configured to convey the carcasses through a plurality of carcass disassembly stations;
   a spray system for directing a fluid at a portion of at least one of the carcasses, the spray system comprising a plurality of nozzles configured to rotate;
   wherein the spray system directs the fluid onto each of the carcasses in a tracking manner as the carcass moves from a first carcass location to a second carcass location.

2. The method of claim 1 wherein the nozzles rotate 360 degrees relative to the track system.

3. The method of claim 1 wherein the nozzles spin in a circular path.

4. The method of claim 1 wherein the nozzles rotate in a clockwise direction.

5. The method of claim 1 wherein the location of each of the carcasses is monitored by an optical sensor, and the direction of the spray system is controlled by a processor using information from the optical sensor.

6. The method of claim 1 wherein the location of each of the carcasses is monitored by a mechanical location measurement sensor, and the direction of the spray system is controlled by a processor using information from the mechanical location measurement sensor.

7. A method for cleaning a plurality of carcasses of harvested animals, comprising:
providing an assembly line for conveying the carcasses through a plurality of carcass processing stations, wherein at least one of the stations comprises a spray nozzle assembly for directing a fluid in a rotating path at a portion of each of the carcasses;
directing the fluid onto each of the carcasses in a tracking manner as the carcass moves from a first location to a second location on the assembly line.

8. The system of claim 7 wherein the fluid is directed onto a neck or forequarter portion of the carcass.

* * * * *